United States Patent [19]

Hiroshima et al.

[11] Patent Number: 5,357,288
[45] Date of Patent: Oct. 18, 1994

[54] LIQUID CRYSTAL PROJECTOR AND METHOD OF PROJECTING IMAGE

[75] Inventors: Yasunori Hiroshima; Tsuyoshi Inoue; Hidetaka Sakurazawa, all of Tokyo, Japan

[73] Assignee: Pioneer Electronic Corporation, Tokyo, Japan

[21] Appl. No.: 986,674

[22] Filed: Dec. 8, 1992

[30] Foreign Application Priority Data

Dec. 10, 1991 [JP] Japan .................. 3-325730

[51] Int. Cl.$^5$ .......................................... H04N 9/31
[52] U.S. Cl. ................... 348/742; 348/758; 348/744; 359/40
[58] Field of Search ............ 358/60, 61, 62, 63, 358/64, 230, 231, 232, 233, 234, 236, 237, 59, 57, 58; 359/40, 41, 63, 64, 66, 70; 348/739, 742, 743, 744, 750, 751, 752, 756, 757, 761, 762, 766, 790, 791, 758; H04N 9/31

[56] References Cited

U.S. PATENT DOCUMENTS

| | | | |
|---|---|---|---|
| 4,191,456 | 3/1980 | Hong et al. | 358/61 |
| 4,582,396 | 4/1986 | Bos et al. | 358/61 |
| 4,715,684 | 12/1987 | Gagnon . | |
| 4,758,884 | 7/1988 | Roy | 358/64 |
| 4,786,146 | 11/1988 | Ledebuhr | 358/60 |
| 4,827,334 | 5/1989 | Johnson et al. | 358/60 |
| 5,172,221 | 12/1992 | Ko | 358/61 |

FOREIGN PATENT DOCUMENTS 0250425 10/1987 Japan .................. 358/60

*Primary Examiner*—James J. Groody
*Assistant Examiner*—Michael H. Lee
*Attorney, Agent, or Firm*—Kane, Dalsimer, Sullivan, Kurucz, Levy, Eisele and Richard

[57] ABSTRACT

A liquid crystal projector projects an image based on video data inputted from the external. The liquid crystal projector is provided with: a timing control device for outputting a predetermined timing signal synchronous with a horizontal scanning period of the video data; a projection light source for emitting a projection light; a color separation device, coupled to the timing control device, for separating the projection light into R, G and B components to output them in a time divisional manner on the basis of the timing signal; a liquid crystal light valve panel, coupled to the timing control device, for displaying images respectively corresponding to the R, G and B components in a time divisional manner on the basis of the video data and the timing signal, and for converting an output light incident from the color separation device to rays of a projection light corresponding to the displayed images; and a projection lens for magnifying and projecting an output light from the liquid crystal light valve panel.

13 Claims, 9 Drawing Sheets

F I G. 10
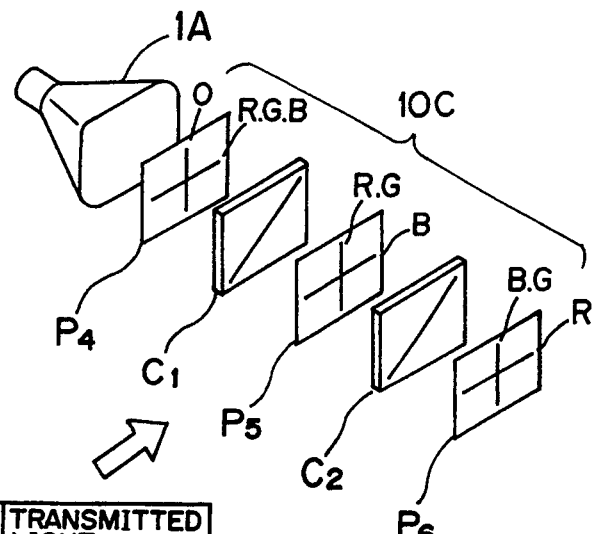
F I G. 11
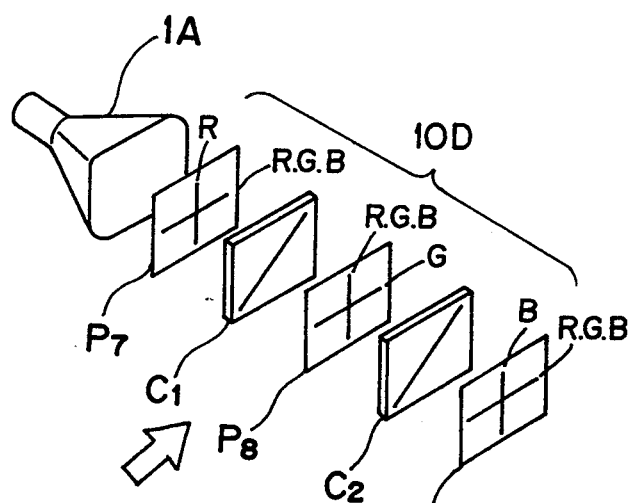

LIQUID CRYSTAL PROJECTOR AND METHOD OF PROJECTING IMAGE

BACKGROUND OF THE INVENTION

1. Field of the Invention

This invention relates to a liquid crystal projector, a method of projecting an image by use of a liquid crystal light valve panel, and more particularly to a color liquid crystal projector using a photoconductive type liquid crystal light valve panel or panels.

2. Description of the Related Art

A color liquid crystal projector has a light source for emitting a white light, a first dichroic mirror adapted for allowing a R(Red) component of the emitted white light to be reflected and allowing other components i.e. G (Green) and B (Blue) components, to be transmitted therethrough, and a second dichroic mirror adapted for allowing the G component of the transmitted light to be reflected and allowing the remaining B component to be transmitted therethrough. The white light is thus separated into R, G and B components by these dichroic mirrors.

The color liquid crystal projector also has three liquid crystal light valve panels for R, G and B components adapted to respectively modulate R, G and B components, and a controller adapted for outputting video (image) data from the external as write data $D_R$, $D_G$ and $D_B$ for every R, G and B component. The color liquid crystal projector further has a first writing CRT (Cathode Ray Tube) adapted to emit a writing light for writing an image corresponding to the R-component of the video data onto the R-component liquid crystal light valve panel on the basis of the write data $D_R$, a second writing CRT adapted to emit a writing light for writing an image corresponding to the G-component of the video data onto the G-component liquid crystal light valve panel on the basis of the write data $D_G$, and a third writing CRT adapted to emit a writing light for writing an image corresponding to the B-component of the video data onto the B-component liquid crystal light valve panel on the basis of the write data $D_B$. Light modulations corresponding to video data are carried out with respect to R, G and B components, respectively.

The color liquid crystal projector further has an optical system adapted to combine three rays of light respectively modulated by the three liquid crystal light valve panels to project an image corresponding to the combined light in an enlarged manner onto a screen. Thus, a color image corresponding to the video data can be obtained on the screen.

In the above-mentioned color liquid crystal projector, since three sets of writing CRTs and liquid crystal light valve panels are used to form an image, there is a problem that the structure of the projector becomes large, and a high assembling accuracy is required, resulting in an increased cost. Further, there is an inconvenience that the back focus or back focal distance (the length from the projection lens to the liquid crystal light valve panel) is elongated, so that the optical system including lens, polarization beam splitter, and the like becomes large, resulting in an increased cost. Furthermore, there is an inconvenience that the degree of freedom in design of the lens is lowered. In addition, since three images are synthesized to provide one color image, it is difficult to obtain an image of high fineness.

SUMMARY OF THE INVENTION

It is therefore an object of the present invention to provide a color liquid crystal projector for which high assembling accuracy is not required, which can become compact, and which can easily obtain an image of high fineness.

According to the present invention, the above object can be achieved by a first liquid crystal projector for projecting an image based on video data inputted from the external. The first liquid crystal projector is provided with: a timing control device for outputting a predetermined timing signal synchronous with a horizontal scanning period of the video data; a projection light source for emitting a projection light; a color separation device, coupled to the timing control device, for separating the projection light into R, G and B components to output them in a time divisional manner on the basis of the timing signal; a liquid crystal light valve panel, coupled to the timing control device, for displaying images respectively corresponding to the R, G and B components on the basis of the video data and the timing signal, and for converting an output light incident from the color separation device to rays of a projection light corresponding to the displayed images; and a projection lens for magnifying and projecting an output light from the liquid crystal light valve panel.

In accordance with the first liquid crystal projector, when the timing control device outputs the predetermined timing signal synchronous with the horizontal scanning period of the video data, the color separation device separates the projection light emitted from the projection light source into the rays of light of R, G and B components to output them in the time divisional manner on the basis of the timing signal. The liquid crystal light valve panel displays the images corresponding to the respective R, G and B components on the basis of the video data and the timing signal, and converts the output light incident from the color separation device to the rays of projection light corresponding to the displayed images to output them. Thus, the projection lens magnifies and projects the output light from the liquid crystal light valve panel.

In this manner, by combination of only one set of the liquid crystal light valve panel, it is easily performed to project a color image in an enlarged manner.

Accordingly, there is no necessity of providing a plurality of liquid crystal light valve panels corresponding to respective R, G and B components, so that the back focus can be shortened. Thus, the structure of the liquid crystal projector can be simplified and become compact, while the assembling accuracy is not so required to obtain a fine projection image. In addition, since the focus deviation is reduced, there occurs little deviation in convergence, according to the first liquid crystal projector of the present invention.

According to the present invention, the above object can be also achieved by a second liquid crystal projector for projecting an image based on video data inputted from the external. The second liquid crystal projector is provided with: a timing control device for outputting a predetermined timing signal synchronous with a horizontal scanning period of the video data; a projection light source for emitting a projection light; a color separation device, coupled to the timing control device, for separating the projection light into R, G and B components to output them in a time divisional manner on the basis of the timing signal; a writing light source, coupled to the timing control device, for emitting rays of writing light respectively corresponding to the R, G and B components on the basis of the video data and the timing signal; a liquid crystal light valve panel of reflection type to which images respectively corresponding to the R, G and B components are written by the rays of writing light emitted from the writing light source; a beam splitter for reflecting the R, G and B components from the color separation device toward the liquid crystal light valve panel, and for transmitting an output light from the liquid crystal light valve panel; and a projection lens for magnifying and projecting the output light from the liquid crystal light valve panel transmitted through the beam splitter.

In accordance with the second liquid crystal projector of the present invention, when the timing control device outputs the predetermined timing signal synchronous with the horizontal scanning period, the color separation device separates the projection light from the projection light source such as a halogen lamp, etc. into the rays of light of R, G and B components to output them to the polarization beam splitter in the time divisional manner on the basis of the timing signal. On the other hand, the writing light source such as CRT, etc. emits the rays of writing light corresponding to the R, G and B components to the liquid crystal light valve panel on the basis of the video data and the timing signal to write the images corresponding to the video data onto the liquid crystal light valve panel. Thus, the rays of projection light projected from the polarization beam splitter onto the liquid crystal light valve panel are caused to be in correspondence with the written images, and are reflected. The rays of reflected light thus obtained are incident to the beam splitter again and are transmitted therethrough. The transmitted light thus obtained is magnified and projected by the projection lens.

In this manner, by combination of only one set of the liquid crystal light valve panel and the writing light source, it is easily performed to project a color image in an enlarged manner.

Accordingly, the structure of the liquid crystal projector can be simplified and become compact, and assembling accuracy is not so required. Further, since the back focus can be shortened, and the optical system including the projection lens, the polarization beam splitter, and the like can become compact, so the cost can be reduced. In addition, since a light is emitted from a single portion and it is unnecessary to synthesize images, it is possible to easily obtain an image of high fineness.

According to the present invention, the above object can be also achieved by a third liquid crystal projector for projecting an image on the basis of video data inputted from the external. The third liquid crystal projector is provided with: a timing control device for outputting a predetermined timing signal synchronous with a horizontal scanning period of the video signal; a projection light source for emitting a projection light; a color separation device, coupled to the timing control device, for separating the projection light into R, G and B components to output them in a time divisional manner on the basis of the timing signal; a first writing light source for emitting, in a time divisional manner for each color component, rays of a first writing light corresponding to any two components of the R, G and B components on the basis of the video data and the timing signal; a second writing light source for emitting a second writing light corresponding to the remaining one component of the R, G and B components on the basis of the video data and the timing signal; a first liquid crystal light valve panel of reflection type onto which an image is written by the first writing light; a second liquid crystal light valve panel of reflection type onto which an image is written by the second writing light; a beam splitter adapted to emit an output light corresponding to the first writing light from the color separation device to the first liquid crystal light valve panel, to emit an output light corresponding to the second writing light from the color separation device to the second liquid crystal light valve panel, and to emit rays of reflected light from the both liquid crystal light valve panels in the same direction; and a projection lens for magnifying and projecting the reflected light emitted from the beam splitter.

In accordance with the third liquid crystal projector of the present invention, when the timing control device outputs the timing signal synchronous with the horizontal scanning period, the color separation device separates the projection light emitted from the projection light source into the rays of R, G and B components on the basis of the timing signal to output them in the time divisional manner to the polarization beam splitter. On the other hand, the first writing light source such as CRT, etc. emits, in the time divisional manner for each respective color component, rays of the first writing light corresponding to arbitrary two components of the R, G and B components on the basis of the video data and the timing signal. Further, the second writing light source emits the second writing light corresponding to the remaining one component of the R, G and B components on the basis of the video data and the timing signal. Thus, images corresponding to respective components are written onto the first liquid crystal light valve panel by the first writing light in the time divisional manner on the basis of the timing signal, and a corresponding image is similarly written onto the second liquid crystal light valve panel on the basis of the timing signal. In addition, the beam splitter emits the output light corresponding to the first writing light of rays of output light from the color separation device onto the first liquid crystal light valve panel, and emits the output light corresponding to the second writing light onto the second liquid crystal light valve panel. Then, the rays of reflected light from the both liquid crystal light valve panels are emitted in the same direction where the projection lens is provided, and are magnified and projected by the projection lens.

In this manner, by combination of only two sets of liquid crystal light valve panels and writing light sources, it is easily performed to project a color image in an enlarged manner. Thus, the structure of the liquid crystal projector can be simplified and become compact, and assembling accuracy is not required to more degree than that in the case where three sets of liquid crystal light valves and writing light sources are used. In addition, since the back focus can be shortened and the optical system including projection lens or polarization beam splitter, etc. can become compact, so the cost can be reduced, according to the third liquid crystal projector of the present invention.

It is another object of the present invention to provide a method of projecting an image of high fineness by use of a liquid crystal light valve panel.

According to the present invention, the above mentioned another object can be achieved by a method of projecting an image including the steps of: inputting video data; performing a synchronization separation with respect to the inputted video data to generate a timing signal; performing a color separation with respect to the inputted video data to generate luminance signals for R, G and B components, respectively; emitting a projection light; separating the emitted projection light into R, G and B components in a time divisional manner on the basis of the generated timing signal; displaying on a liquid crystal light valve panel, images for R, G and B components based on the generated luminance signals in the time divisional manner on the basis of the generated timing signal; inputting the separated projection light to the liquid crystal light valve panel; and magnifying and projecting an output light from the liquid crystal light valve panel onto a screen.

In the projecting method of the present invention, it is preferable that the separating step includes the steps of: selectively transmitting and shutting each R, G and B component by operating shutters for the R, G and B components, respectively; and combining the selectively transmitted R, G and B components. In this case, it is preferable that the separating step includes the step of separating the R, G and B components in such a time divisional manner as to transmit each R, G and B component during a time period not longer than one sixth of a vertical synchronization period of the inputted video data based on the generated timing signal, so as to prevent the crossover between the different color components. The color separation performing step, may include the step of performing a YC (luminance signal and color-difference signal) separation with respect to the inputted video data.

Consequently, an image of high fineness can be projected according to the projecting method of the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 10 is a view showing another example of the configuration of the color separation system of the third embodiment; and FIG. 11 is a view showing another example of the configuration of the color separation system of the third embodiment.

DETAILED DESCRIPTION OF THE PREFERRED EMBODIMENTS

Preferred embodiments of this invention will now be described with reference to the attached drawings.

First Embodiment

Figure 1:
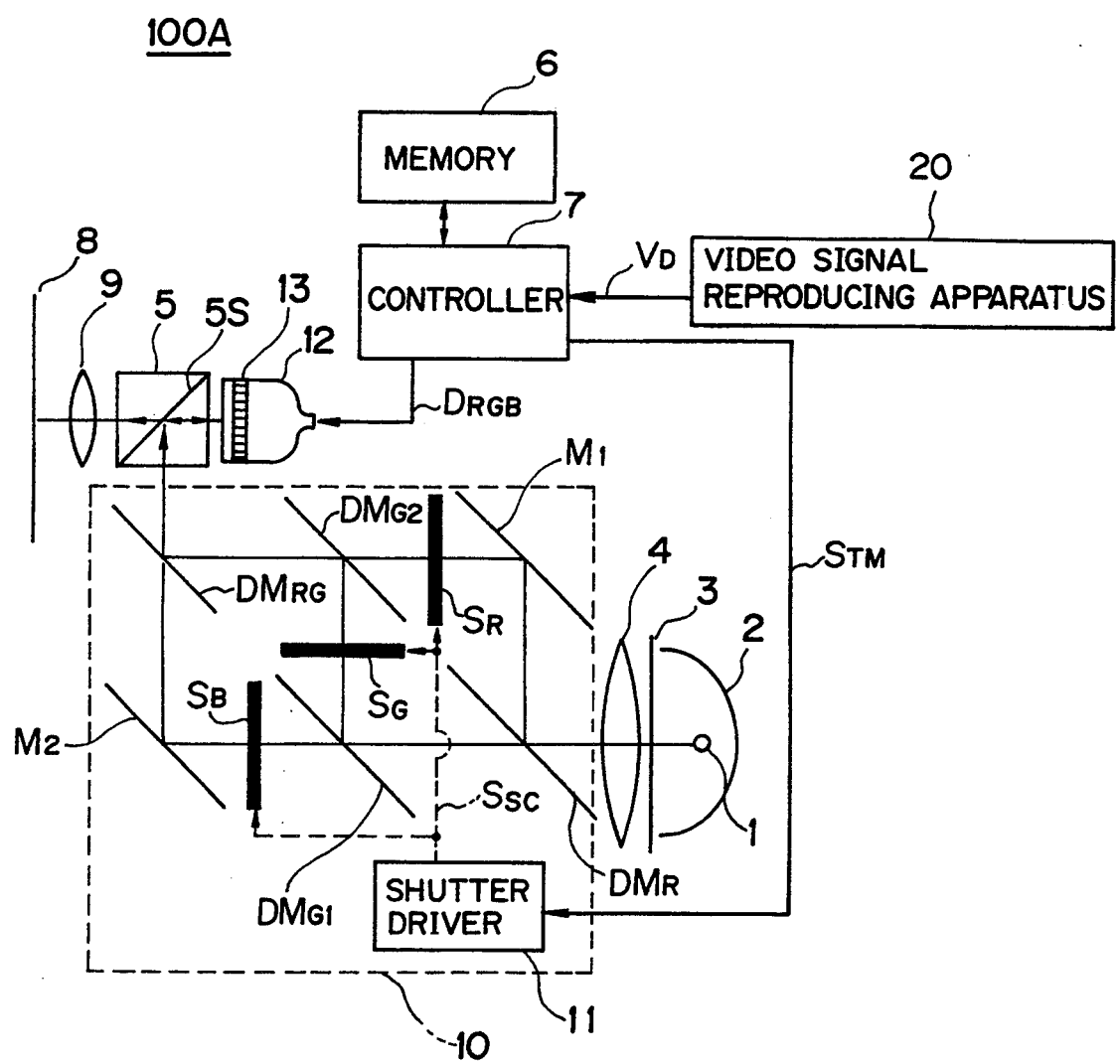
FIG. 1 is a block diagram showing a basic configuration of a first embodiment.

FIG. 1 is a view showing the outline of a basic configuration of a first embodiment of the present invention.

A liquid crystal projector 100A includes a light source 1 for emitting a projection light of a white light. A projection light emitted from the light source 1 is reflected by a reflector 2. The reflected light thus obtained is incident to an UV filter 3, at which the ultraviolet ray component is eliminated therefrom. The light transmitted through the UV filter 3 is changed to a parallel light beam by a collimator lens 4. The parallel light beam thus obtained is incident to a color separation system 10.

The color separation system 10 separates the incident projection light into respective R, G and B components in a time divisional manner on the basis of a timing signal $S_{TM}$ synchronous with a horizontal scanning period from a controller 7 to emit them to a polarization beam splitter 5. It is to be noted that a memory 6 is used in the case where a portion of video data VD is outputted as a still picture.

A light reflected by a reflection surface 5S of the polarization beam splitter 5 is incident to a liquid crystal light valve panel 13 as a projection light. The video data VD are inputted from a video signal reproducing apparatus 20 such as a VTR (Video Tape Recorder), a TV (Television) tuner, or a LDP (Laser vision Disk Player), etc. being as video data VD.

A writing CRT 12 allows a writing light corresponding to video data inputted through the controller 7 to be incident to the liquid crystal light valve panel 13.

Figure 2:
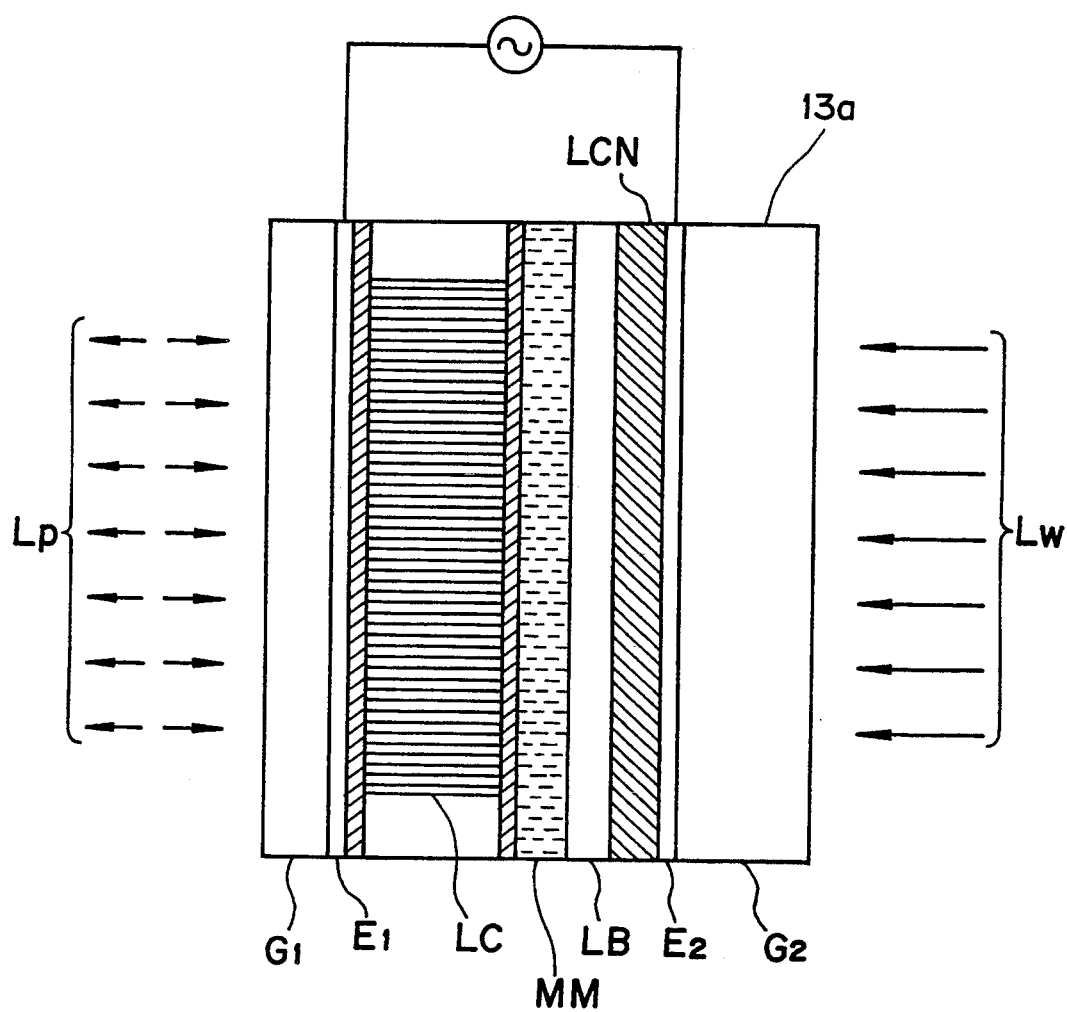
FIG. 2 is a schematic cross-sectional view showing the configuration of a reflection photoconductive type liquid crystal light valve panel.

The structure of the liquid crystal light valve panel 13 will now be described with reference to FIG. 2. In FIG. 2, a reflection photoconductive type liquid crystal light valve panel 13a as an example of the liquid crystal light valve panel 13 includes: a liquid crystal layer LC; transparent electrodes $E_1$, $E_2$ for applying an a.c. voltage, which are provided between glass substrates $G_1$ and $G_2$; a reflection film MM; a light block layer LB and a photoconductive layer LCN, which are provided between the liquid crystal layer LC and the transparent electrode $E_2$.

The resistance value of the photoconductive layer LCN varies between a resistance value per unit area in the case where a light is irradiated (ON or bright resistance: $R_{on}$) and a resistance value per unit area in the case where no light is irradiated (OFF or dark resistance; $R_{off}$). The liquid crystal layer LC is equivalently considered to be a parallel circuit of capacitor and high impedance resistor. Accordingly, if an a.c. voltage of, e.g., about 1 KHz is applied across the transparent electrodes $E_1$ and $E_2$, and a writing light ($L_W$) is applied from the writing CRT 12, when the writing light $L_W$ is bright, the resistance value of the photoconductive layer LCN is lowered to be $R_{on}$. As a result, a large potential is applied to the equivalent capacitor of the liquid crystal layer LC. Thus, an electro-optical effect such that a light transmitted quantity of the liquid crystal layer LC increases, takes place. In contrast, when the writing light $L_W$ is dark, the resistance value of the photoconductive layer LCN is increased to be $R_{off}$. As a result, a small potential is applied to the equivalent capacitor of the liquid crystal layer LC. Thus, an electro-optical effect such that a light transmitted quantity of the liquid crystal layer LC decreases, takes place. By such electro-optical effect, images corresponding to the state of the writing light $L_W$ are formed into the liquid crystal layer LC.

Accordingly, the projection light $L_P$ incident from the glass substrate $G_1$ side is caused to be a light corresponding to the image formed in the liquid crystal layer LC and is reflected by the reflection film MM.

The color separation system 10 in FIG. 1 will now be explained in detail with reference to FIGS. 1 and 3. It is to be noted that explanation will be given in connection with the case where a projection light is separated in a time divisional manner in the order of R, G and B.

The color separation system carries out a color separation operation as described below. Namely, at a first timing (time $t_0 \sim t_1$: emission of a light for the R-component) based on the timing signal $S_{TM}$, the R-component reflected by a dichroic mirror $DM_R$ for allowing the R-component of an incident projection light to be reflected and allowing G and B components to be transmitted therethrough, is reflected by a mirror $M_1$. The reflected light thus obtained is incident to a shutter $S_R$. At this stage, since the timing signal $S_{TM}$ indicates the timing at which the R-component should be emitted, a shutter driver 11 allows the shutter $S_R$ to be placed in an open state by a shutter control signal $S_{SC}$. Further, the shutter driver 11 allows shutters $S_G$ and $S_B$ to be placed in a closed state. Accordingly, the R-component of the projection light is transmitted through the shutter $S_R$, and is further transmitted through a dichroic mirror $DM_{G2}$ adapted for allowing the G-component to be reflected and allowing the R-component to be transmitted therethrough. This R-component of the projection light transmitted through the dichroic mirror $DM_{G2}$ is reflected by a dichroic mirror $DM_{RG}$ adapted for allowing the G-component and the R-component to be reflected, and is then emitted to the polarization beam splitter 5.

In this case, the time for placing the shutter $S_R$ in an open state is determined as follows in the case of the NTSC (National Television System Committee) system. Namely, in the case where the response characteristic (response curve) of the liquid crystal light valve panel is as shown in FIG. 3, the action times of respective cells constituting the liquid crystal light valve panel are set to a value not greater than 2.78 m sec. (=1 [sec]/30 [pictures]/2 [fields]/3 [color components]/2). The reason why division by 2 is performed here, is to prevent crossover between different color components. In this case, it is necessary to use a value less than at least 1.39 m sec. as the response speeds $\tau$ of respective cells of the liquid crystal light valve panel. In the case where the action times of respective cells are 2.78 m sec., the time required for emission of a writing light by CRT (writing time) is set to 5.56 m sec. Thus, an image of one field of an image corresponding to the R-component is displayed for 5.56 m sec. When a time of 5.56 m sec. elapses, such display is completed. It is to be noted that, in FIG. 3, only the response curve of a first cell to be displayed in the field corresponding to the R-component, the response curve of a final cell thereof, and the response curve of a first cell to be displayed in the field corresponding to the G-component, are indicated.

At a second timing (time $t_1 \sim t_2$: emission of a light for the G-component), G and B components of the incident projection light are transmitted through the dichroic mirror $DM_R$. Among these transmitted components, only the G-component is reflected by a dichroic mirror $DM_{G1}$, and is then incident to the shutter $S_G$. At this stage, since the timing signal $S_{TM}$ indicates the timing at which the G-component should be emitted, the shutter driver 11 places the shutter $S_G$ in an open state by the shutter control signal $S_{SC}$. Thus, the G-component of the projection light is transmitted through the shutter $S_G$, and is then reflected by the dichroic mirror $DM_{G2}$ and the dichroic mirror $DM_{RG}$. The reflected light component thus obtained is emitted to the polarization beam splitter 5.

At a third timing (time $t_2 \sim t_3$: emission of a light for the B-component), the G and B components of the incident projection light are transmitted through the dichroic mirror $DM_R$. Only the B-component among these transmitted light components is transmitted through the dichroic mirror $DM_{G1}$, and is then incident to the shutter $S_B$. At this stage, since the timing signal $S_{TM}$ indicates the timing at which the B-component should be emitted, the shutter driver 11 places the shutter $S_B$ in an open state by the shutter control signal $S_{SC}$. Accordingly, the B-component of the projection light is transmitted through the shutter $S_B$, and is then reflected by a mirror $M_2$. The reflected light component thus obtained is transmitted through the dichroic mirror $DM_{RG}$, and is then emitted to the polarization beam splitter 5.

Figure 3:
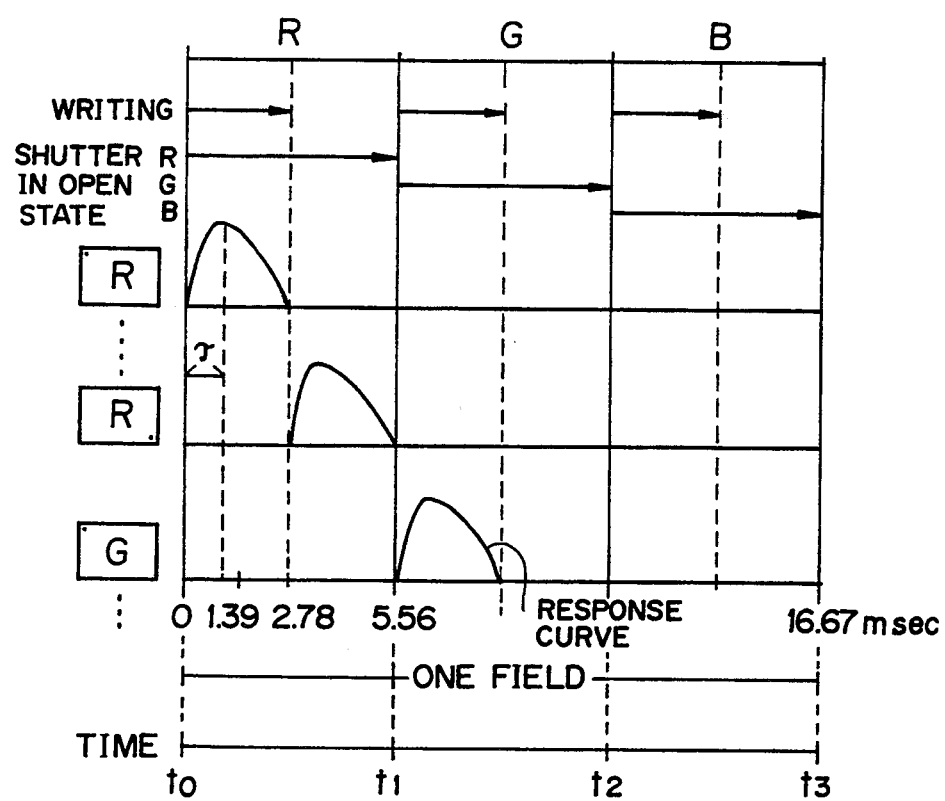
FIG. 3 is an explanatory view of the operation of the first embodiment.

Simultaneously with the above-described color separation, the controller 7 allows the writing CRT 12 to display thereon images every R, G and B components one after another as indicated by a write signal of FIG. 3 in synchronism with the timing signal $S_{TM}$, with a video signal from a video signal reproducing apparatus such as a VTR (Video Tape Recorder), a TV (Television) tuner, or a LDP (Laser vision Disk Player), etc. being as video data VD. An output light from the writing CRT 12 is irradiated onto the photoconductive layer LCN (see FIG. 2) of the liquid crystal light valve panel 13. When the resistance of the photoconductive layer LCN is lowered, a voltage is applied to the liquid crystal layer LC. As a result, the electro-optical effect takes place in the liquid crystal layer LC. At this time, since the ON resistance $R_{on}$ of the photoconductive layer LCN is dependent upon the intensity of the writing light $L_W$, a voltage applied to the liquid crystal layer LC also depends upon the intensity of the writing light $L_W$. For this reason, an image corresponding to the writing light, i.e., the video data VD is formed in the liquid crystal layer LC.

Accordingly, the projection light reflected by the reflection surface 5S of the polarization beam splitter 5 is reflected by the reflection film MM of the liquid crystal light valve panel 13 at an intensity corresponding to the image displayed on the writing CRT 12, and is polarized and emitted simultaneously therewith. The projection light thus emitted is transmitted through the polarization beam splitter 5, and is magnified and projected by the projection lens 9. Thus, an enlarged image is formed on the screen 8.

As stated above, since a liquid crystal projector can be constituted by using one set of writing CRT 12 and liquid crystal light valve panel 13, the structure of the liquid crystal projector can be simplified and become compact, and assembling accuracy is not so required. In addition, since the back focus can be shortened and the optical system including the projection lens or the polarization beam splitter, etc. can also become compact, the cost can be also reduced.

Second Embodiment

Figure 4:
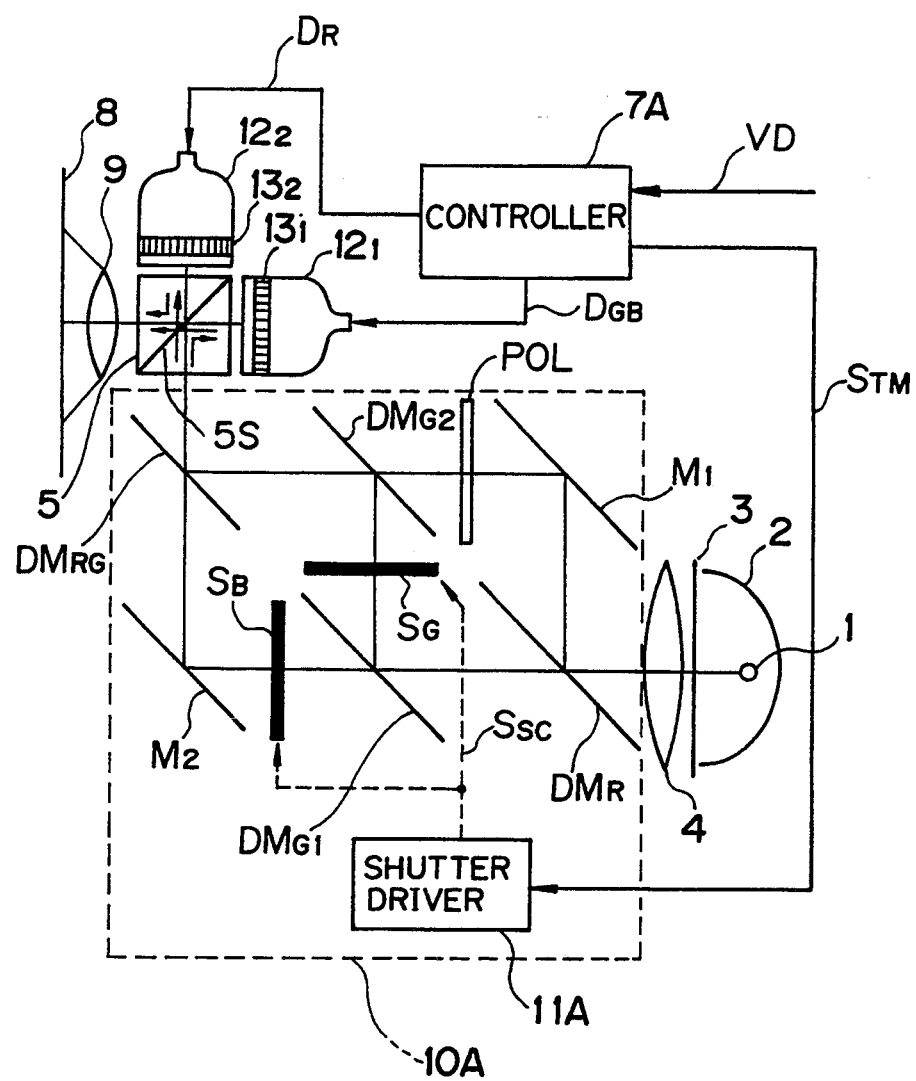
FIG. 4 is a block diagram showing the basic configuration of a second embodiment.
Figure 5:
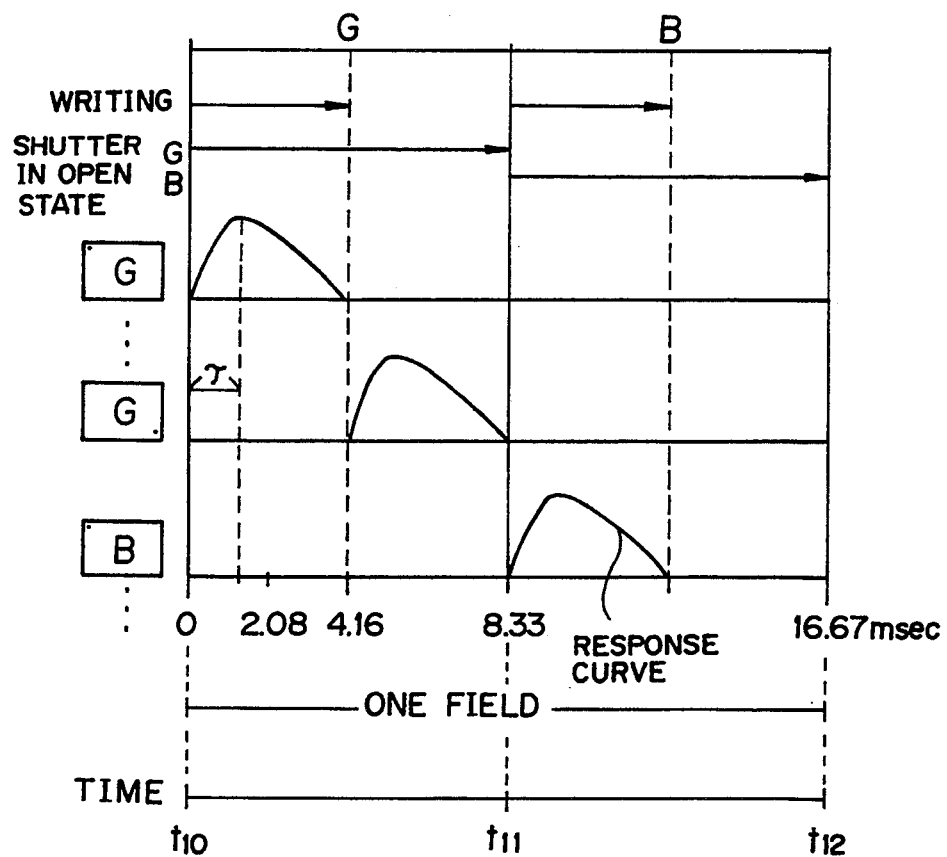
FIG. 5 is an explanatory view of the operation of the second embodiment.

While explanation has been given in the above-described first embodiment in connection with the case where one set of writing CRT and liquid crystal light valve panel is used, a second embodiment in which two sets of writing CRTs and liquid crystal light valve panels are used, will now be described with reference to FIGS. 4 and 5. In FIGS. 4 and 5, the same elements as those in the first embodiment in FIG. 1, carry the same reference numerals and the explanations thereof are omitted.

A liquid crystal projector 100B includes the light source 1 adapted for emitting a projection light of a white light. A projection light emitted from the light source 1 is changed to a parallel light beam by the collimator lens 4, and is incident to a color separation system 10A.

The color separation system 10A separates, in a time divisional manner, the incident projection light into R, G and B light components on the basis of a timing signal $S_{TM}$ from a controller 7A to emit them to polarization beam splitter 5. In this case, it is assumed that the G and B light components are reflected by reflection surface 5S of polarization beam splitter 5, and are emitted to a first writing CRT $12_1$ side, and the R-component is emitted to a second writing CRT $12_2$ side.

The color separation system 10A will now be explained in detail with reference to FIG. 5. It is to be noted that explanation will be given in connection with the case where a projection light is separated in a time divisional manner in the order of the G and B components in parallel to separation of the R-component.

The color separation system 10A carries out a color separation operation as follows. Namely, the R-component of an incident projection light reflected by dichroic mirror $DM_R$ adapted for allowing the R-component to be reflected and allowing the G and B components to be transmitted therethrough is reflected by mirror $M_1$, and is then incident to a polarization plate POL. Accordingly, the R-component of the projection light is transmitted through the polarization plate PLO, resulting in a linear polarized light. The linear polarized light thus obtained is transmitted through the dichroic mirror $DM_{G2}$ adapted for allowing the G-component to be reflected and allowing the R-component to be transmitted therethrough, and is reflected by the dichroic mirror $DM_{RG}$ adapted for allowing G and R components to be reflected. The reflected light thus obtained is emitted to the polarization beam splitter 5, and is transmitted therethrough. The transmitted light thus obtained is emitted to the second writing CRT $12_2$.

Simultaneously with this, at a first timing (time $t_{10} \sim t_{11}$: emission of a light for the G-component) based on the timing signal $S_{TM}$, the G and B components of the incident projection light are transmitted through the dichroic mirror $DM_R$. Only the G-component of these components is reflected by the dichroic mirror $DM_{G1}$, and is then incident to the shutter $S_G$. At this stage, since the timing signal $S_{TM}$ indicates the timing at which the G-component should be emitted, a shutter driver 11A places the shutter $S_G$ in an open state by the shutter control signal $S_{SC}$. Thus, the G-component of the projection light is transmitted through the shutter $S_G$, and is reflected by the dichroic mirrors $DM_{G2}$ and $DM_{RG}$. The reflected light component thus obtained is emitted to the polarization beam splitter 5. In this case, the time for allowing the shutter $S_G$ to be in an open state is determined as follows in the case of the NTSC system. Namely, in the case where the response characteristic (response curve) of a liquid crystal light valve panel $13_1$ is as shown in FIG. 5, the action times of respective cells constituting the liquid crystal light valve panel $13_1$ are set to a value not greater than at least 4.16 m sec (=1 [sec.]/30 [pictures]/2 [fields]/2 [color components]/2). The reason why division by 2 is performed here, is to prevent crossover between different color components (between G and B components). In this case, in the liquid crystal light valve panel $13_1$, a response time not greater than at least 2.08 m sec. is used as the response times $\tau$ of the respective cells. Further, in the case where the action times of respective cells are 4.16 m sec., the time required for emission of a writing light by the writing CRT (writing time) is set to 8.33 m sec. Thus, an image of one field of an image corresponding to the R-component is displayed for 8.33 m sec. When a time of 8.33 m sec. elapses, such display is completed. It is to be noted that only the response curve of a first cell to be displayed in that field corresponding to the G-component, the response curve of a final cell thereof, and the response curve of a first cell to be displayed in that field corresponding to the B-component, are indicated in FIG. 5.

At a second timing (time $t_{11} \sim t_{12}$: emission of a light for the B-component), the G and B components of the incident projection light are transmitted through the dichroic mirror $DM_R$. Only the B-component of these light components is transmitted through the dichroic mirror $DM_{G1}$, and is then incident to the shutter $S_B$. At this stage, since the timing signal $S_{TM}$ indicates the timing at which the B-component should be emitted, the shutter driver 11A places the shutter $S_B$ in an open state by the shutter control signal $S_{SC}$. Accordingly, the B-component of the projection light is transmitted through the shutter $S_B$ and is reflected by the mirror $M_2$. The reflected light thus obtained is transmitted through the dichroic mirror $DM_{RG}$, and is then emitted to the polarization beam splitter 5.

In synchronism with the above-described color separation, the controller 7A receives, as video data, a video signal from a video signal reproducing apparatus such as VTR (Video Tape Recorder), TV (Television) tuner, or LDP (Laser vision Disk Player), etc. and separates it into R, G and B color components. Thereafter, in synchronism with the timing signal $S_{TM}$, the controller 7A allows the first writing CRT $12_1$ to alternatively display thereon images every G and B components, and allows the second writing CRT $12_2$ to continuously display thereon an image of R-component. Rays of output lights of the first and second writing CRT $12_1$ and CRT $12_2$, are irradiated onto the photoconductive layers LCN (see FIG. 2) of the first and second liquid crystal light valve panels $13_1$ and $13_2$, respectively. As a result, when the resistance value of each photoconductive layer LCN is lowered, a voltage is applied to the liquid crystal layer LC, so the electro-optical effect takes place in the liquid crystal layer LC. At this time, since the ON resistance $R_{on}$ of the photoconductive layer LCN is dependent upon the intensity of the writing light $L_W$, a voltage applied to the liquid crystal layer LC also depends upon the intensity of the writing light $L_W$. Thus, an image corresponding to the intensity of the writing light $L_W$, i.e., video data is formed in the liquid crystal layer LC.

Accordingly, rays of projection lights corresponding to the G and B components incident from the polarization beam splitter 5 are reflected by the reflection film of the liquid crystal light valve panel $13_1$ at an intensity corresponding to the image displayed on the first writing CRT $12_1$, and are polarized and emitted simultaneously therewith. The light components thus emitted are transmitted through the polarization beam splitters 5 again, and are magnified and projected by the projection lens 9. Thus, enlarged images of G and B components are formed in sequence on the screen 8.

On the other hand, a projection light corresponding to the R-component incident from the polarization beam splitter 5 is reflected by the reflection film of the liquid crystal light valve panel $13_2$ at an intensity corresponding to the image displayed on the second writing CRT $12_2$, and is polarized and emitted simultaneously therewith. The light component thus emitted is reflected by the polarization beam splitter 5, and is magnified and projected by the projection lens 9. Thus, an enlarged image corresponding to the R-component is formed on the screen 8. This enlarged color image is synthesized with enlarged images of G and B components. Thus, a resultant enlarged color image is formed on the screen 8. Accordingly, an enlarged color image is formed on the screen 8 from a visual point of view.

As stated above, since a liquid crystal projector can be constituted by using two sets of writing CRTs and liquid crystal light valve panels, the structure of the liquid crystal projector can be simplified and become compact, and assembling accuracy is not so required as compared to the case where three sets of writing CRTs and liquid crystal light valve panels are used. Further, the back focus (the distance from the projection lens to the liquid crystal light valve panel) can be shortened, and the optical system including the projection lens, etc. can become compact. Accordingly, the cost can be reduced. In addition, a liquid crystal light valve having a response speed and an action speed lower than those of the first embodiment can be used. It is to be noted that while it has been described in the above-described embodiments that R of R, G and B components is a continuous projection light, one of R, G and B components may be selected as a continuous projection light in dependency upon a color light component having a slow action time of the liquid crystal layer LC, the reaction speed of the shutter $S_G$ or $S_B$, etc., or the characteristics corresponding to respective colors of the liquid crystal layer LC.

Third Embodiment

The third embodiment differs from the above-described first and second embodiments in that the color separation system is constituted with $\pi$ cells and color polarization plates. Thus, the color separation system can become compact, so the liquid crystal projector can also become compact on the whole.

The $\pi$ cell ($\lambda/2$ wave plate) is a liquid crystal element adapted for rotating the plane of polarization by 90 degrees. In the case where no electric field is applied to a TN (Twisted Nematic) liquid crystal (at the time of OFF), the plane of polarization of an incident lights rotated by 90 degrees. In contrast, in the case where an electric field is applied (at the time of ON), the incident light is permitted to be transmitted through the $\pi$ cell with the plane of polarization remaining in the original state.

The operation of the third embodiment will now be explained with reference to FIG. 6.

A color separation system 10B includes two color polarization plates $P_1$ and $P_2$, a neutral polarization plate $P_3$, and two $\pi$ cells $C_1$ and $C_2$. These optical components are arranged as shown in FIG. 6, for example. This color separation system 10B separates a white light (projection light) from a light source 1A into respective R, G and B components. In FIG. 6, reference symbol O represents an axis of absorption of the neutral polarization plate $P_3$.

The operation of the color separation system 10B will now be explained with reference to FIGS. 6 and 7. In FIG. 7, the planes of polarization of a light which has been transmitted through the polarization plate(s) or the cell(s) are indicated by arrows.

Figure 6:
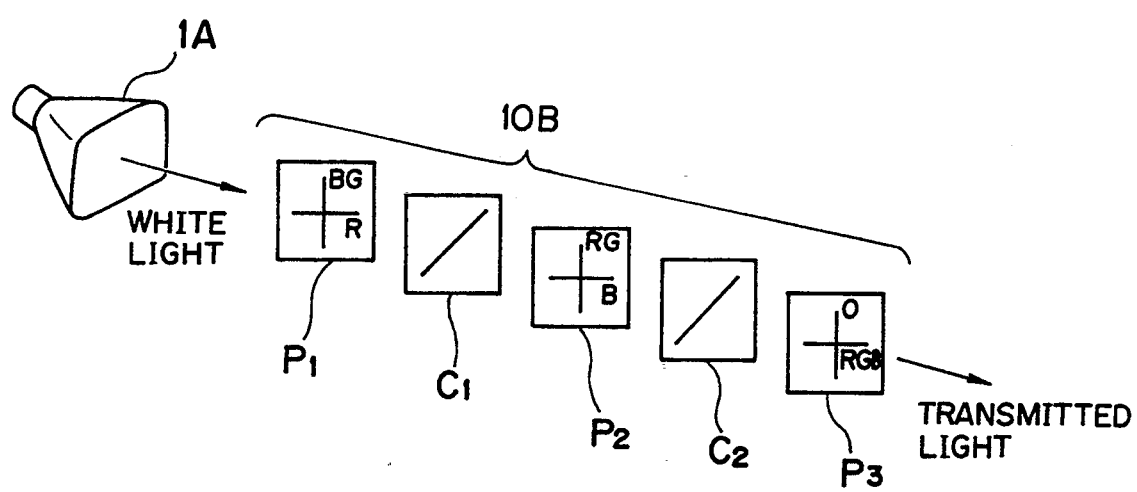
FIG. 6 is a diagram showing the configuration of a color separation system of a third embodiment.
Figure 7:
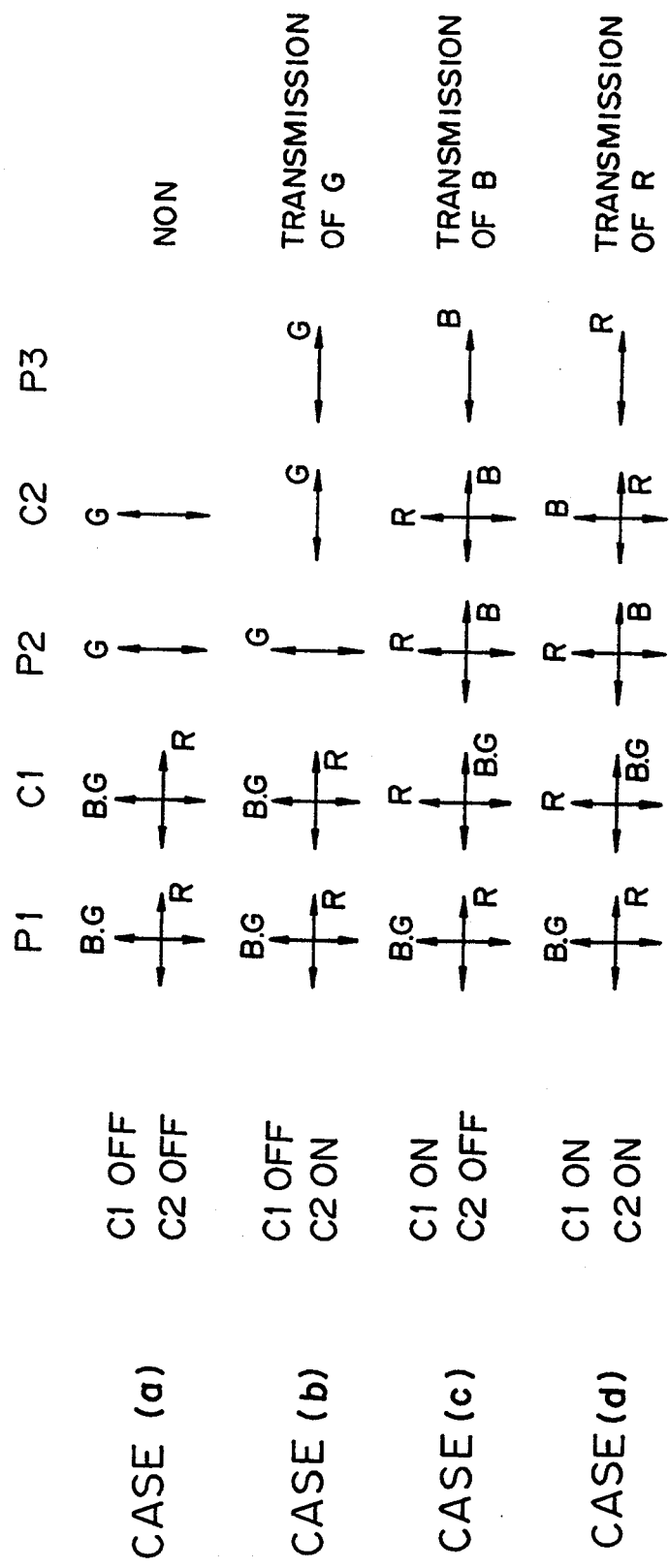
FIG. 7 is an explanatory view of the operation of the third embodiment.

In the case where the polarization plates and the $\pi$ cells are arranged as shown in FIG. 6, when the $\pi$ cells $C_1$ and $C_2$ are turned OFF (when no voltage is applied), there is no transmitted light in the case (a) of shown in FIG. 7. Further, when the $\pi$ cell $C_1$ is turned OFF and the $\pi$ cell $C_2$ is turned ON in the case (b) shown in FIG. 7, only the G-component is transmitted. Similarly, in the case (c) shown in FIG. 7, only the B-component is transmitted. In the case (d) shown in FIG. 7, only the R-component is transmitted.

Figure 8:
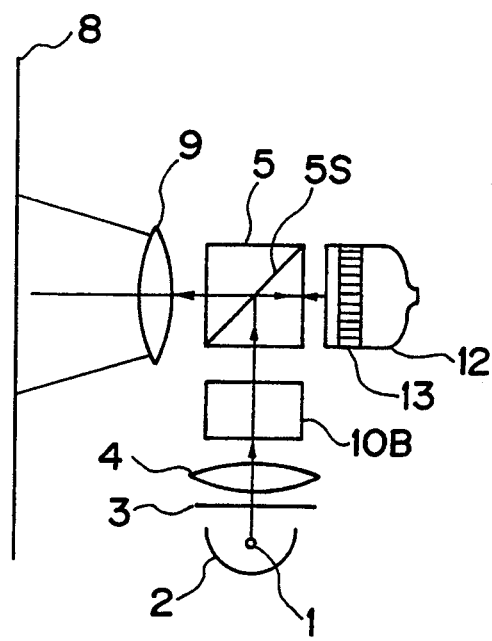
FIG. 8 is a block diagram showing a basic configuration of the color separation system of the third embodiment.
Figure 9:
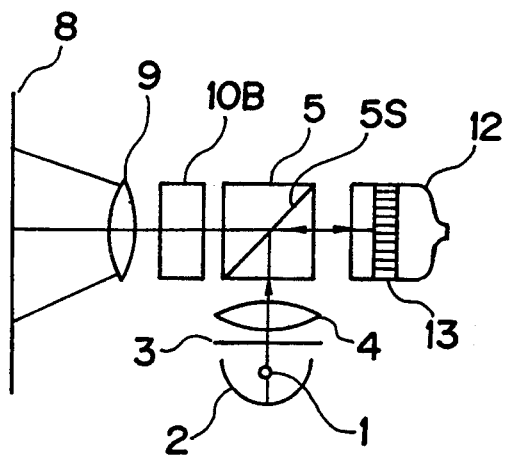
FIG. 9 is a block diagram showing another configuration of the color separation system of the third embodiment.

Accordingly, as indicated by a liquid crystal projector 100C of FIG. 8, this color separation system 10B may be used in place of the color separation system 10 of the first embodiment. In accordance with the liquid crystal projector 100C thus constructed, a light emitted from the light source 1 is changed to a parallel light beam by the collimator lens 4 to separate, by using the color separation system 10B, not only a projection light of the parallel light beam thus obtained, but also timing signal $S_{TM}$ in synchronism with a horizontal synchronizing signal every R, G and B components, and to deliver those signals synchronously every respective components to the writing CRT 12. Thus, similar advantages to those of the first embodiment can be obtained. Further, in accordance with the color separation system of the third embodiment, the color separation system can become compact. For this reason, this color separation system may be provided at the succeeding stage of the polarization beam splitter 5 as in a liquid crystal projector 100D shown in FIG. 9.

While the color separation system has been described only in connection with the example of combination of the color polarization plates, the neutral polarization plate, and the cells in the above-described third embodiment, this invention may be applied to other combinations of color polarization plates and $\pi$ cells. For example, also by the configurations of the color separation systems 10C and 10D shown in FIGS. 10 and 11, similar advantage can be provided. In these cases, reference symbols $P_5 \sim P_9$ represent a color polarization plate, and reference symbol $P_4$ represents a neutral polarization plate. In addition, the operations of respective $\pi$ cells $C_1$ and $C_2$ and the states of a transmitted light are shown in FIGS. 10 and 11, respectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A liquid crystal projector, for projecting an image on the basis of video data inputted from the external, comprising:
   a timing control means for outputting a predetermined timing signal synchronous with a horizontal scanning period of the video signal;
   a projection light source for emitting a projection light;
   a color separation means, coupled to said timing control means, for separating said projection light into R, G and B components to output them in a time divisional manner on the basis of the timing signal;
   a first writing light source for emitting, in a time divisional manner for each color component, rays of a first writing light corresponding to any two components of the R, G and B components on the basis of the video data and the timing signal;
   a second writing light source for emitting a second writing light corresponding to the remaining one component of the R, G and B components on the basis of the video data and the timing signal;
   a first liquid crystal light valve panel of reflection type onto which an image is written by said first writing light;
   a second liquid crystal light valve panel of reflection type onto which an image is written by said second writing light;
   a beam splitter adapted to emit an output light corresponding to the first writing light from said color separation means to said first liquid crystal light valve panel, to emit an output light corresponding to the second writing light from said color separation means to said second liquid crystal light valve panel, and to emit rays of reflected light from said both liquid crystal light valve panels in the same direction; and
   a projection lens for magnifying and projecting the reflected light emitted from said beam splitter.

2. A liquid crystal projector as set forth in claim 1, wherein said color separation means comprises a shutter for selectively transmitting and shutting each R, G and B component, and a shutter driver for driving said shutter on the basis of the timing signal.

3. A liquid crystal projector as set forth in claim 2, wherein said shutter comprises a $\pi$ cell and a polarization plate.

4. A liquid crystal projector, for projecting a projection image based on externally inputted video data, comprising:
   a timing control means for outputting a predetermined timing signal synchronous with a horizontal scanning period of the video data;
   a projection light source for emitting a projection light;
   a color separation means, coupled to said timing control means, for separating the projection light into R, G and B components to output them in a time divisional manner on the basis of the timing signal, said color separation means comprising a liquid crystal shutter for selectively transmitting and shutting each R, G and B component, and a shutter driver for driving said liquid crystal shutter on the basis of the timing signal;
   a liquid crystal light valve panel, which is coupled to said timing control means and into which images corresponding to the R, G and B components are written in a time divisional manner at a timing every 1/6 field in every ⅓ field per color component during a first half of every ⅓ field respectively, for converting an output light incident from said color separation means to rays of a projection light corresponding to said written images, said shutter driver driving said liquid crystal shutter to open at the timing every ⅓ field including said 1/6 field per color component respectively, so that said written images are read out every ⅓ field per color component respectively as said rays of the projection light, said liquid crystal light valve panel comprising cells each having an action time not greater than a time period of said 1/6 field; and
   a projection lens for magnifying and projecting said rays of the projection light from said liquid crystal light valve panel.

5. A liquid crystal projector as set forth in claim 4, wherein said liquid crystal shutter comprises a $\pi$ cell and a polarization plate.

6. A liquid crystal projector as set forth in claim 4, further comprising a beam splitter for directing the R, G and B components from said color separation means toward said liquid crystal light valve panel, and for directing the rays of the projection light from said liquid crystal light valve panel toward said projection lens.

7. A liquid crystal projector as set forth in claim 4, further comprising a writing light source, coupled to said timing control means, for emitting, to said liquid crystal light valve panel, rays of writing light respectively corresponding to the R, G and B components in a time divisional manner on the basis of the video data and the timing signal, whereby to write the image of each R, G and B component into said liquid crystal light valve panel at the timing every 1/6 field of the image.

8. A liquid crystal projector as set forth in claim 4 wherein, in case that the time duration of one field is 16.67 msec, the time duration for writing the image is 2.78 msec per each color, and an action time of the liquid crystal light valve panel is not greater than 1.39 msec.

9. A method of projecting a projection image, comprising the steps of:
   inputting video data;
   performing a synchronization separation with respect to the inputted video data to generate a timing signal;
   performing a color separation with respect to the inputted video data to generate luminance signals for R, G and B components, respectively;
   emitting a projection light;
   separating the emitting projection light into R, G and B components by a liquid crystal shutter in a time divisional manner to selectively transmit and shut each R, G and B component on the basis of the generated timing signal;
   writing into a liquid crystal light valve panel, images corresponding to the R, G and B components based on the generated luminance signals at a timing every 1/6 field in every ⅓ field per color component during a first half of said every ⅓ field respectively, in the time divisional manner on the basis of the generated timing signal, said liquid crystal valve panel comprising cells each having an action time not greater than a time period of said 1/6 field;

inputting the separated projection light to said liquid crystal light valve panel, while opening said liquid crystal shutter at the timing every ⅓ field including said 1/6 field per color component respectively, whereby to read out said written images every ⅓ field per color component respectively; and magnifying and projecting an output light from said liquid crystal light valve panel onto a screen.

10. A projecting method as set forth in claim 9, wherein said liquid crystal shutter comprises a $\pi$ cell and a polarization plate.

11. A projecting method as set forth in claim 9, wherein said writing step comprises the step of inputting writing lights for the R, G and B components based on the generated luminance signals in the time divisional manner, form one side of said liquid crystal light valve panel, said separated projection light being inputted from the other side of said liquid crystal light valve panel.

12. A projecting method as set forth in claim 9, wherein the separated projection light and the output light from said liquid crystal light valve panel are transmitted through a common beam splitter for directing the separated projection light toward said liquid crystal light valve panel and for directing the output light from said liquid crystal light valve panel toward said screen.

13. A projecting method as set forth in claim 9, wherein, in case that the time duration of one field is 16.67 msec, the time duration for writing the image is 2.78 msec per each color, and an action time of the liquid crystal light valve panel is not greater than 1.39 msec.

* * * * *